Feb. 11, 1947.  C. D. PETERSON ET AL  2,415,758
TRANSFER GEAR CASE
Filed May 23, 1944  5 Sheets-Sheet 1

INVENTORS
CARL D. PETERSON
AND ELMER J. BARTH
BY
ATTORNEYS

Feb. 11, 1947.  C. D. PETERSON ET AL  2,415,758
TRANSFER GEAR CASE
Filed May 23, 1944  5 Sheets-Sheet 2

INVENTORS
CARL D. PETERSON
AND ELMER J. BARTH
BY
ATTORNEYS

Feb. 11, 1947.        C. D. PETERSON ET AL        2,415,758
TRANSFER GEAR CASE
Filed May 23, 1944        5 Sheets-Sheet 3
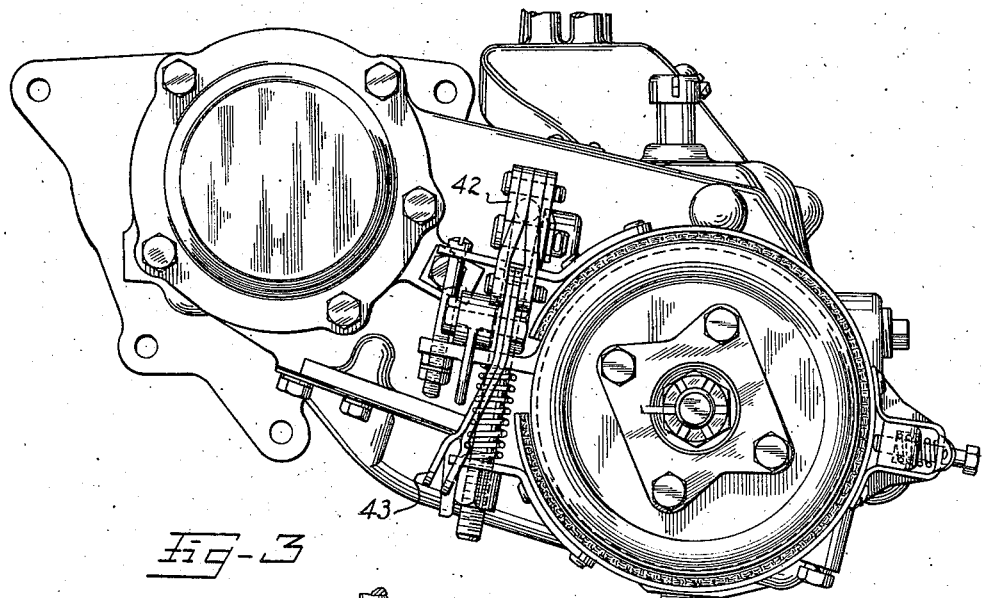
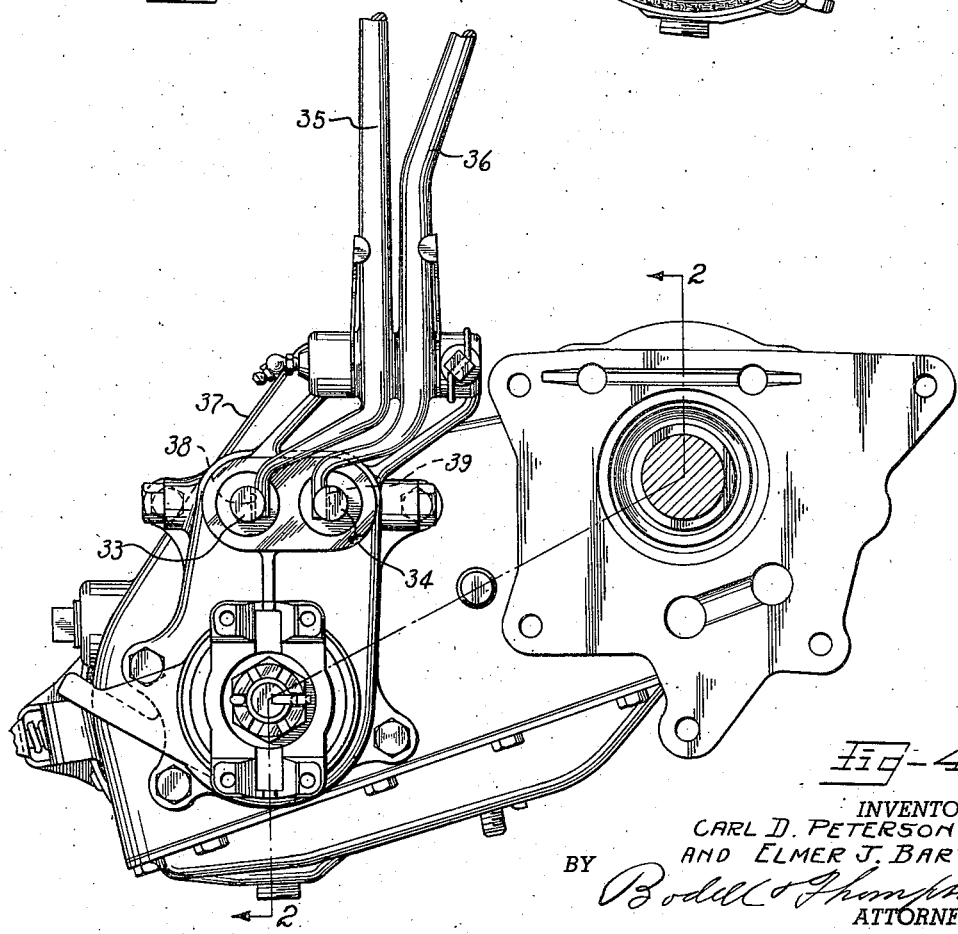
INVENTORS
CARL D. PETERSON
AND ELMER J. BARTH
BY
ATTORNEYS Feb. 11, 1947. C. D. PETERSON ET AL 2,415,758
TRANSFER GEAR CASE
Filed May 23, 1944 5 Sheets-Sheet 4

INVENTORS
CARL D. PETERSON
AND ELMER J. BARTH
BY
ATTORNEYS

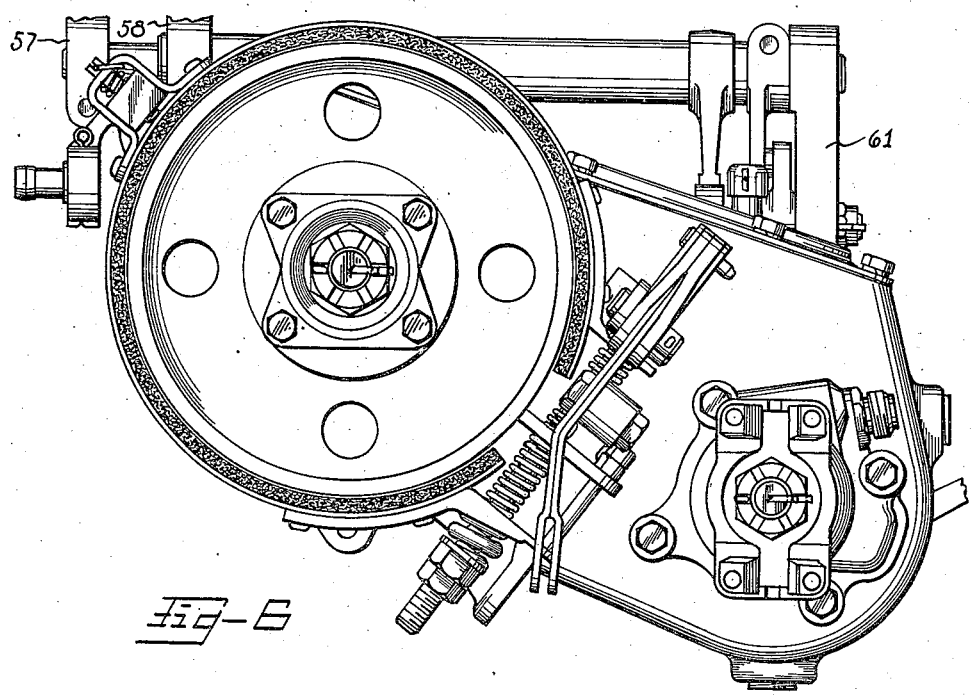
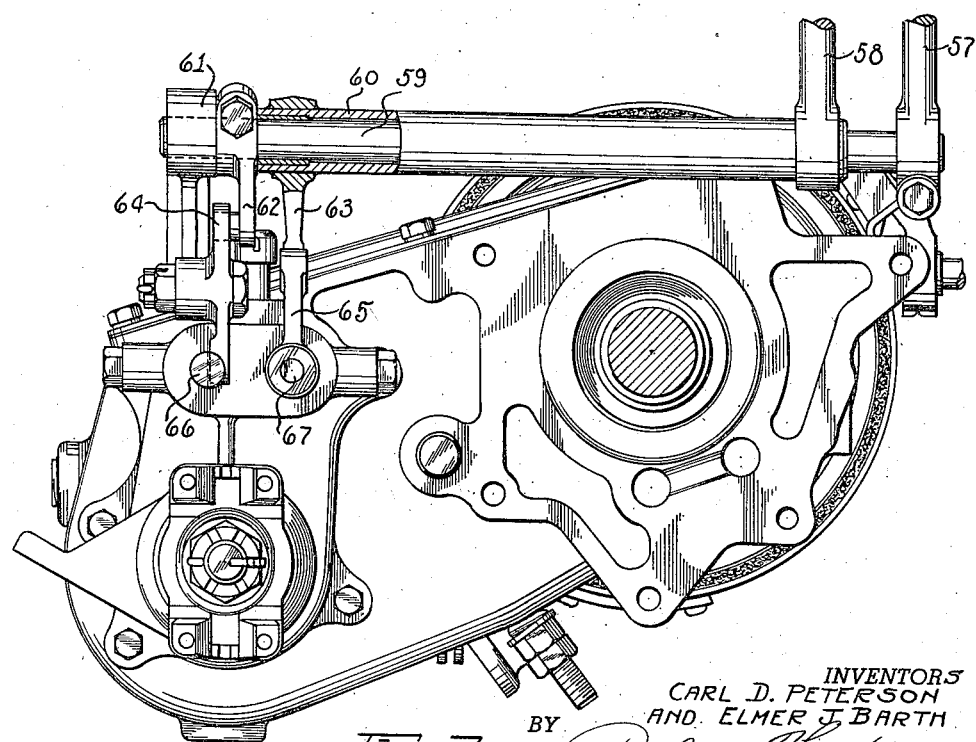

Patented Feb. 11, 1947

2,415,758

UNITED STATES PATENT OFFICE 2,415,758

TRANSFER GEAR CASE

Carl D. Peterson and Elmer J. Barth, Toledo, Ohio; said Barth assignor to Dana Corporation, Toledo, Ohio, a corporation of Virginia Application May 23, 1944, Serial No. 536,918

2 Claims. (Cl. 74—343)

This invention has for its object an auxiliary gear and gear case for use in connection with or attachment to a main gear box, and more specifically has for its object an auxiliary or transfer gear case, by which the power coming from a motor of a vehicle through the main change-speed gear box, is readily applied to both the front and the rear axles of the vehicle, or only to one of said axles, as the rear axle at the will of the driver. It also has for its object an auxiliary gear case or box construction and the arrangement of gearing therein which results in an extremely compact unit to supply the power, through propeller shafts, to both the front and rear axles with provision for choice as to whether one axle only, as the rear axle, is to be power driven, and also providing for two gear ratios to one or both axles.

The invention consists in the novel features and in the combinations and constructions hereinafter set forth and claimed.

In describing this invention, reference is had to the accompanying drawings in which like characters designate corresponding parts in all the views.

Figure 3 is an end elevation looking to the left in Figure 2.

Figure 4 is an opposite end elevation from that seen in Figure 3.

Figures 6 and 7 are views looking to the left and right respectively in Figure 5.

This gearing is for supplying a driving force to the front and rear axles of a vehicle by applying a transfer gear to the main change-speed gearing and for driving the axles through a plurality, preferably two gear ratios, in addition to the gear changes provided by the change-speed gearing in the main gear box, and for connecting or disconnecting one of the axles, as the front axle, and the power drive at will. It further has for its object a particularly compact arrangement of the transfer gear case ad the gears therein by which it is compactly applied to a main gear box.

Figure 1:
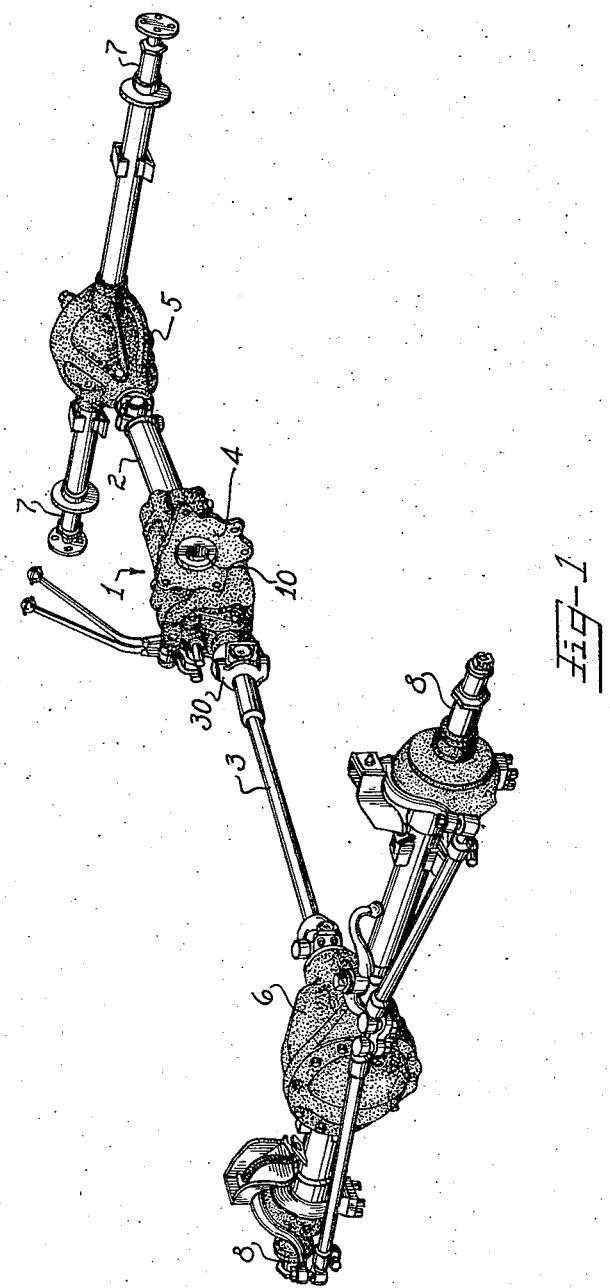
Figure 1 is a fragmentary perspective view of a front and rear wheel axle drive, the engine and the main gear box being omitted.

In Figure 1, the transfer case is shown as embodied in a front and rear drive axle unit applied to the frame or body carrying the engine, change-speed transmission gear, vehicle springs, etc.

1 designates the transfer case; 2 and 3 propeller shafts to the rear and the front axles respectively from the two output shafts within the transfer gear box; 4 a face plate on the body of the transfer case for attachment to the main gear box, in which is located a conventional change-speed transmission gearing with, for instance, three speeds forward and reverse, the input shaft of the main gear box being connected to the engine supported on the chassis in any well known manner. 5 and 6 are housings for differential gears through which the power is transmitted to the front and rear ground wheels, the rear wheels being mounted on spindles 7 on the axle shaft section and the front wheels on spindles 8 capable of being turned through knuckle mechanism to steer the vehicle, all as is well understood. A fragmentary portion of the main gear box is shown in broken lines at 9 (Figure 2).

The transfer case 1 includes a main body having the face plate or flange 4 at one side and the major portion of the body extending laterally therefrom. The part of the body on which the face plate is provided being formed with an opening 10 in which is mounted a bearing for the output shaft of the change-speed gearing, this output shaft being the input shaft 11 (Figure 2) of the transfer gearing within the transfer box. 12 and 13 designate output shafts mounted in axial alinement in suitable bearings in the transfer case 1 and located in a general horizontal direction laterally from the portion of the case in which the input shaft 11 is located, the output shaft 12 being connected by the propeller shaft 2 to the rear axle shaft through the differential gearing 5. The output shaft 13 is connected to the propeller shaft 3, which drives the front wheels, mounted on the spindles 8. The transfer case is a one-piece unitary structure with two exceptions hereinafter pointed out, but with bearings for the various shafts located in opposing walls of the integral portion of the case. The two exceptions are: (A) that the bottom portion of the case, which serves as an oil sump is provided with a removable pan 14, and (B) that the lateral portion is provided with a removable cover 15 alined with the shaft 11.

The input shaft 11 is connected to one of the output shafts, as the shaft 12, which drives the rear axle, through two trains of gears to transmit different gear ratios. The output shaft 13 which drives the front axle may be connected and disconnected at will from the shaft 12 by a suitable jaw clutch 16. The gear ratios may be whatever are required to give the desired performance of the particular vehicle in which the transfer case is utilized. One or more gear ratios may be provided to give at least one high and one low speed range.

Figure 2:
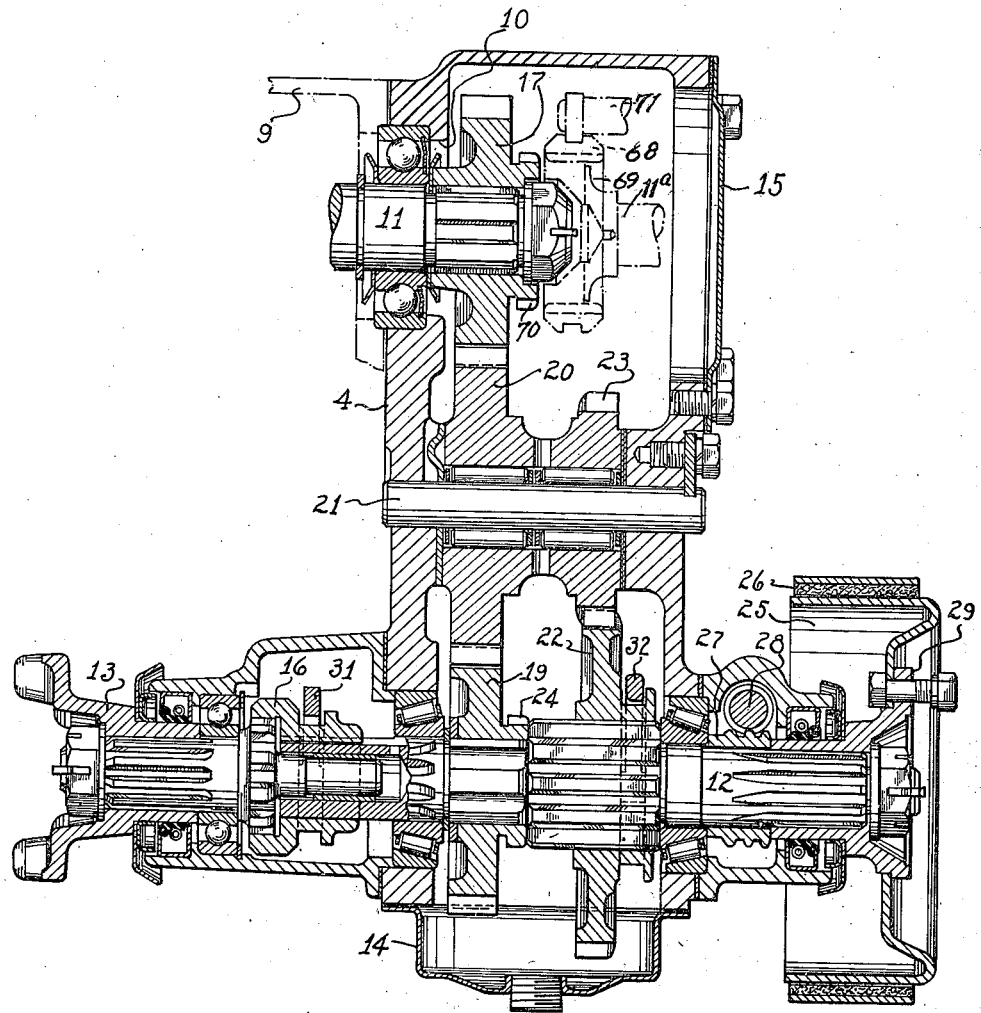
Figure 2 is an enlarged sectional view taken approximately on the plane of line 2—2, Figure 4.

In the form shown in Figure 2, one train of gears includes the drive gear 17 on the input shaft, a driven gear 19 on the output shaft 12 and an intermediary gear 20 mounted on a suitable spindle 21 in the body of the transfer case 1, the gear 19 being rotatably mounted on the output shaft 12 and connectable thereto by a clutch gear 22 keyed or splined on the output shaft 12 and forming part of the reduction gear train. The reduction gear train also includes the clutch gear 22 which may be meshed with an intermediary gear 23 on the spindle 21 and rotatable as a unit with the gear 20. The clutch gear 22 is shiftable from the position in which 20 it is in mesh with the gear 23 into an intermediate position and from the intermediate position to clutch engaged position with the gear 19. The gear 19 is provided with external clutch teeth 24 for coacting with splines in the bore of the gear 22. When the clutch gear 22 is in position to clutch the gear 19 to the shaft 12, the drive is through a high speed gear ratio between the input shaft 11 and the output shaft 12. If the clutch 16 is shifted into engaged position, both the front and rear axles will be actuated through the high speed gear ratio. If the clutch 16 is disengaged only the rear axle will be driven by power. When the clutch gear 22 is in position shown in Figure 2, where it is engaged with the intermediary gear 23, the rear axle will be driven through the output shaft 12 from the drive gear 17 through the gears 20, 23 and 22. The other output shaft 13 driving the front wheel will also be so actuated, if the clutch 16 is engaged.

A suitable vehicle brake is carried on the output shaft 12, which drives the propeller shaft 2 to the rear axle. As seen in Figure 2, this includes a brake drum 25 mounted directly on the output shaft 12 outside the transfer case, with which coacts a brake band 26. The output shaft 12 may also drive a suitable speedometer mechanism through the spiral gearing 27, 28. The mounting for the brake drum 25 is provided with a coupling at 29 for connection to one section of the universal joint at the front end of the propeller shaft 2. The output shaft 13 is also provided with one section of a universal joint 30 (Figure 1) for the propeller shaft 3.

The clutch 16 and clutch gear 22 are shiftable by suitable forks 31 and 32 connected to shift rods 33 and 34, which in turn are operated by hand levers 35 and 36, the shift rods being located in the body of the transfer case 1 directly above output shafts 12, 13 and the levers being mounted in a suitable bracket 37 on the integral top side of the transfer gear case and having arms extending downwardly in front of the front side of the transfer gear case at one side of the face plate 4, where they interlock at 38 and 39 in suitable notches in the front ends of the shift rods 33, 34 which extend through the front side of the transfer gear case 1.

The brake band 26 is applied in any well known manner by brake band mechanism 42 mounted on the rear wall of the transfer gear case and operable to contract the brake band on the brake drum. The brake mechanism is operated through a suitable lever 43 for connection to a brake pedal remote from the gear case.

Figure 5:
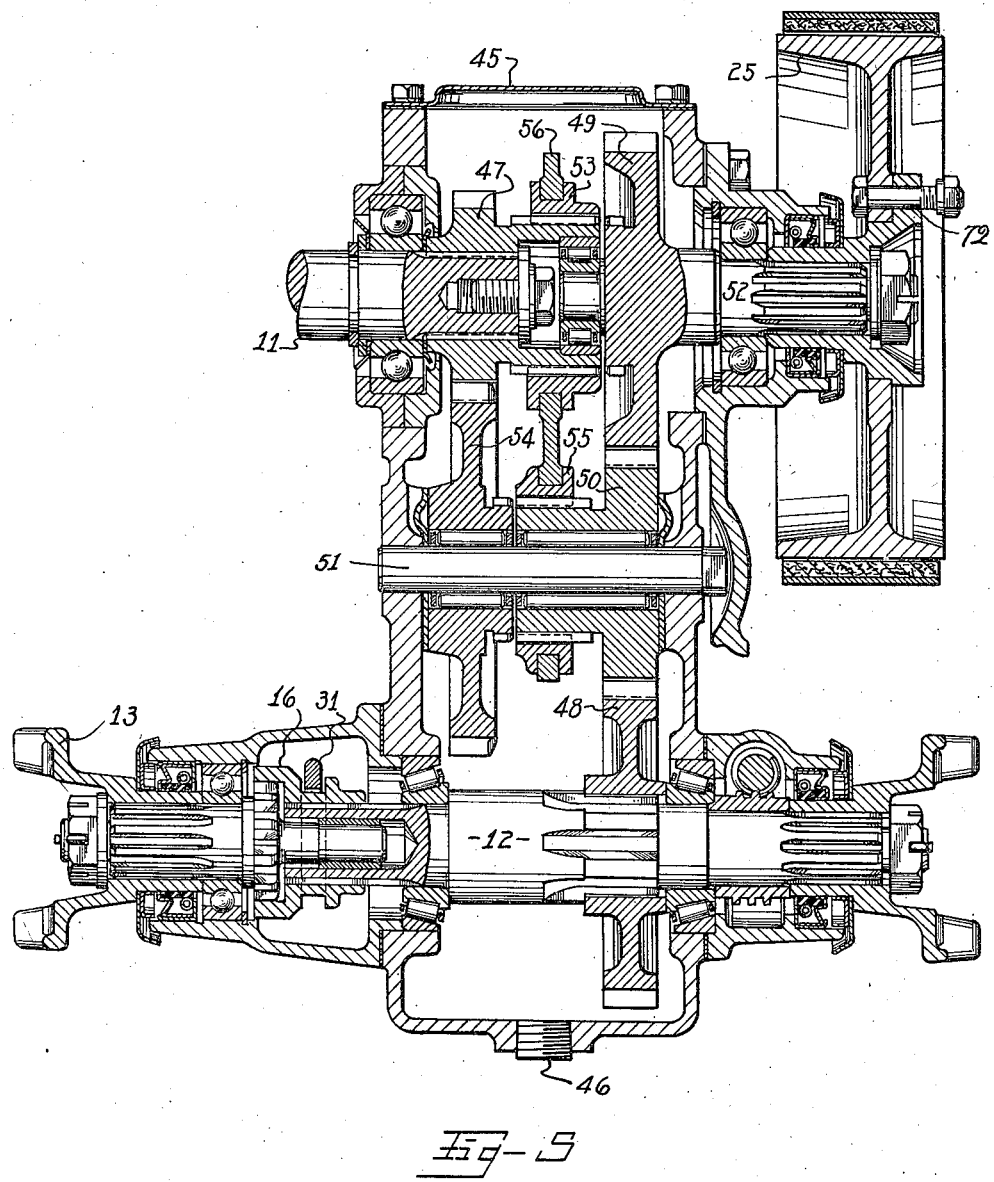
Figure 5 is a view similar to Figure 2 of a modified arrangement of the gearing within the gear box and of the brake.

In the form shown in Figures 5, 6 and 7, the transfer case is an integral structure with the top open and provided with a removable cap 45. The bottom, however, is integral with the side and end walls and is provided with a drain plug 46 for the oil within the lower part of the transfer gear case, which acts as a sump.

In the construction shown in Figure 5, the transfer gearing and the brake arrangement and levers are slightly modified from the corresponding structures shown in Figures 2, 3 and 4 and also an additional output shaft provided.

In Figure 5, the trains of gears between the input shaft 11 and the output shafts 12, 13 are through a high speed gear ratio as follows: drive gear 47 on the input shaft 11, driven gear 48 on the output shaft 12, intermediary gear 50 meshing with the gears 49, 48, when the gear 49 is clutched to act as a unit with the gear 47. The gear 50 is mounted on a spindle 51 mounted in the gear box. In this construction, the brake drum 25 is mounted on a separate shaft 52 mounted in the case in line with the input shaft 11 and connected or clutched thereto through a clutch 53 operable to clutch an extended hub or sleeve on the drive gear 47 to the hub of the gear 49 when shifted in one direction, as to the right. The gear 49 is a unit with the brake shaft 52. The low speed gear ratio is through the gear 54 on the spindle 51 and meshing with the drive gear 47. The gear 54 is clutchable to the gear 50 to act as a unit therewith by a shiftable clutch section 55. The gear 49 of the high speed gear ratio is clutched to the alined drive gear 47 through a clutch section 53 shiftable to the right from the position shown in Figure 5 to clutch the gear 49 to the gear 47. The two clutches 53 and 55 are shiftable as a unit by one fork 56. When the drive is through the low speed gear ratio, the clutch 55 is shifted to clutch the intermediary gear 54. When the drive is through the low speed gear ratio or through the intermediary gears 54 and 50 acting as a unit, the brake shaft 52 is unclutched from the drive gear 47. When the brake shaft 52 is unclutched from the drive shaft 11, the brake is still effective when the drive is from the drive shaft 11 through gears 47, 54, 50 and 48, since the gear 49 on the brake shaft is in mesh with the gear 50. The fork for shifting the clutch 16 between the output shafts 12 and 13 and the double fork 56 are operated from two hand levers 57 and 58, these being mounted on concentric inner and outer shafts 59 and 60 extending transversely of the gear casing 1 and mounted in suitable bracket 61 thereon. These levers are located on the side of the casing nearest the input shaft instead of the side nearest the output shaft 1, as in Figures 1, 2 and 3.

A third power take off shaft may be provided here shown as driven directly from the input shaft 11. In Figure 2, this third power take off is shown in dot-dash lines. 11ª designates the power take off shaft. It may be clutched to the gear 17 on the input shaft 11 by a normally open clutch 68 slidably splined on a collar 69 on the shaft 11ª and shiftable into and out of engagement with clutch teeth 70 on the hub of the drive gear 17, the shaft 11ª being mounted in alinement with the shaft 11. The shaft 11ª is mounted in a suitable bearing, not shown, provided in a plate substituted for the cover 15, in a manner similar to that in which the bearing for the shaft 52 in Figure 5 is mounted. The clutch 68 is operated by a suitable shift rod 71 to which is connected an additional shift lever. Thus, the shaft 11ᵃ may be actuated at any time the clutch 68 is shifted into clutching engagement with the shaft 11 through the clutch teeth 70 on the gear 17 and hence this power take off may be used at any time when the vehicle is in motion or when the output shafts 12, 13 are unclutched.

In the form shown in Figure 5, the brake shaft 52 is used as a third power take off, and for this purpose the brake drum or the hub thereof is provided with one section of a coupling 72 for connection to another section on a propeller shaft for power take off purposes. As the shaft 52 is clutched to the shaft 11 through the clutch 53 when shifted to the right, power may be taken off directly from the shaft 11 and indirectly from the shaft 11, when the clutch 55 is shifted to the left.

The inner and outer concentric shafts 59 and 60 are connected by rock arms 62, 63 which co-act with arms 64 and 65, which in turn coact with the shift rods 66, 67. The shift rod 66 operates the fork 56 and hence the clutches 53, 55 and the arm 65 operates the clutch 16 in Figure 5 between the output shafts 12 and 13, the arm 64 being double and pivoted between its ends.

The brake mechanism is substantially the same as that shown in Figure 2 with the exception of the location of the brake drum.

What we claim is:

1. An auxiliary transfer gearing including a case for attachment to a main, change-speed gear box, an input shaft journalled in the case, this being the output shaft of the gearing in the main gear box, a pair of axially alined output shafts journalled in the case, a third shaft journalled in the case in axial alinement with the input shaft, gears on the input and on the third shafts and rotatable therewith respectively, a gear on one of the output shafts, a pair of intermediary gears, one meshing with the gear on the input shaft and the other with the gears on the third and the output shafts, a clutch shiftable in one direction to clutch the input and the third shafts together and thus effect a drive through one train of gears, a second clutch shiftable in the opposite direction to clutch the intermediary gear which meshes with the gear on the input shaft to the other intermediary gear, means for shifting said clutches in unison, whereby the clutches are shiftable alternately into engaged position from idle position, and a clutch operable to clutch the output shafts directly together.

2. An auxiliary transfer gearing including a case for attachment to a main, change-speed gear box, an input shaft journalled in the case, this being the output shaft of the gearing in the main gear box, a pair of axially alined output shafts journalled in the case, a third shaft journalled in the case in axial alinement with the input shaft, gears on the input and on the third shafts and rotatable therewith respectively, a gear on one of the output shafts, a pair of intermediary gears, one meshing with the gear on the input shaft and the other with the gears on the third and the output shafts, a clutch shiftable in one direction to clutch the input and the third shafts together and thus effect a drive through one train of gears, a second clutch shiftable in the opposite direction to clutch the intermediary gear which meshes with the gear on the input shaft to the other intermediary gear, means for shifting said clutches in unison, whereby the clutches are shiftable alternately into engaged position from idle position, a clutch operable to clutch the output shafts directly together, and a brake including a drum mounted on the third shaft outside of the casing.

CARL D. PETERSON.
ELMER J. BARTH.

REFERENCES CITED

The following references are of record in the file of this patent:

UNITED STATES PATENTS

| Number | Name | Date |
| --- | --- | --- |
| 2,362,925 | Peterson et al. | Nov. 14, 1944 |
| 2,357,781 | Randol | Sept. 5, 1944 |
| 1,903,221 | MacKenzie | Mar. 28, 1933 |
| 1,875,386 | MacKenzie | Sept. 6, 1932 |
| 994,130 | Daimler | June 6, 1911 |
| 2,352,301 | Welles | June 27, 1944 |
| 2,344,388 | Bixby | Mar. 14, 1944 |
| 2,290,089 | Bock | July 14, 1942 |

FOREIGN PATENTS

| Number | Country | Date |
| --- | --- | --- |
| 437,945 | German | Oct. 31, 1925 |
| 363,027 | Italian | Sept. 15, 1938 |
| 501,498 | British | Feb. 28, 1939 |

OTHER REFERENCES

Maintenance Manual for Willys Truck, TM–10–1513 (publication), May 15, 1942.

Automotive Power Transmission Units, TM–10–585 (publication), April 10, 1941.